United States Patent [19]
Oberreuter et al.

[11] Patent Number: 5,707,283
[45] Date of Patent: Jan. 13, 1998

[54] DUAL BAFFLE SYSTEM IN AUTOMATIC AIR INLETS FOR LIVESTOCK FACILITIES

[75] Inventors: Mark E. Oberreuter, Decatur, Ill.; Steven J. Hoff; Fernando Perez-Munoz, both of Ames, Iowa

[73] Assignee: Iowa State University Research Foundation, Inc., Ames, Iowa

[21] Appl. No.: 688,386

[22] Filed: Jul. 30, 1996

[51] Int. Cl.⁶ .................................................. F24F 7/007
[52] U.S. Cl. ...................... 454/259; 137/512.5; 137/513; 119/448
[58] Field of Search .................................. 454/253, 259, 454/271, 273, 326, 336; 137/512.5, 513; 119/448

[56] References Cited

U.S. PATENT DOCUMENTS

| 173,518 | 2/1876 | Tingley | 454/259 X |
|---|---|---|---|
| 2,823,600 | 2/1958 | Cole | 454/259 |
| 3,590,858 | 7/1971 | Martin | 454/259 X |
| 4,794,852 | 1/1989 | Ee | 454/271 |

FOREIGN PATENT DOCUMENTS

| 10640 | 4/1900 | United Kingdom | 454/273 |

*Primary Examiner*—Harold Joyce
*Attorney, Agent, or Firm*—Zarley, McKee, Thomte, Voorhees, & Sease

[57] ABSTRACT

A dual baffle system which can be incorporated into automatic air inlets used in livestock facilities. This system consists of four different components: two baffles, spring, opening mechanisms, and stationary bracket. This baffle system is positioned inside an automatic air inlet. The two baffles are hinged at the top and bottom of the inlet respectively and the opening between the baffles is allowed to increase or decrease. The opening mechanism is connected to the bottom baffle and allowed to slip through the stationary bracket. These two components allow the two baffles to open and close simultaneously. The spring allows the system to open and close to maintain the desired flow rate through the inlet.

5 Claims, 9 Drawing Sheets

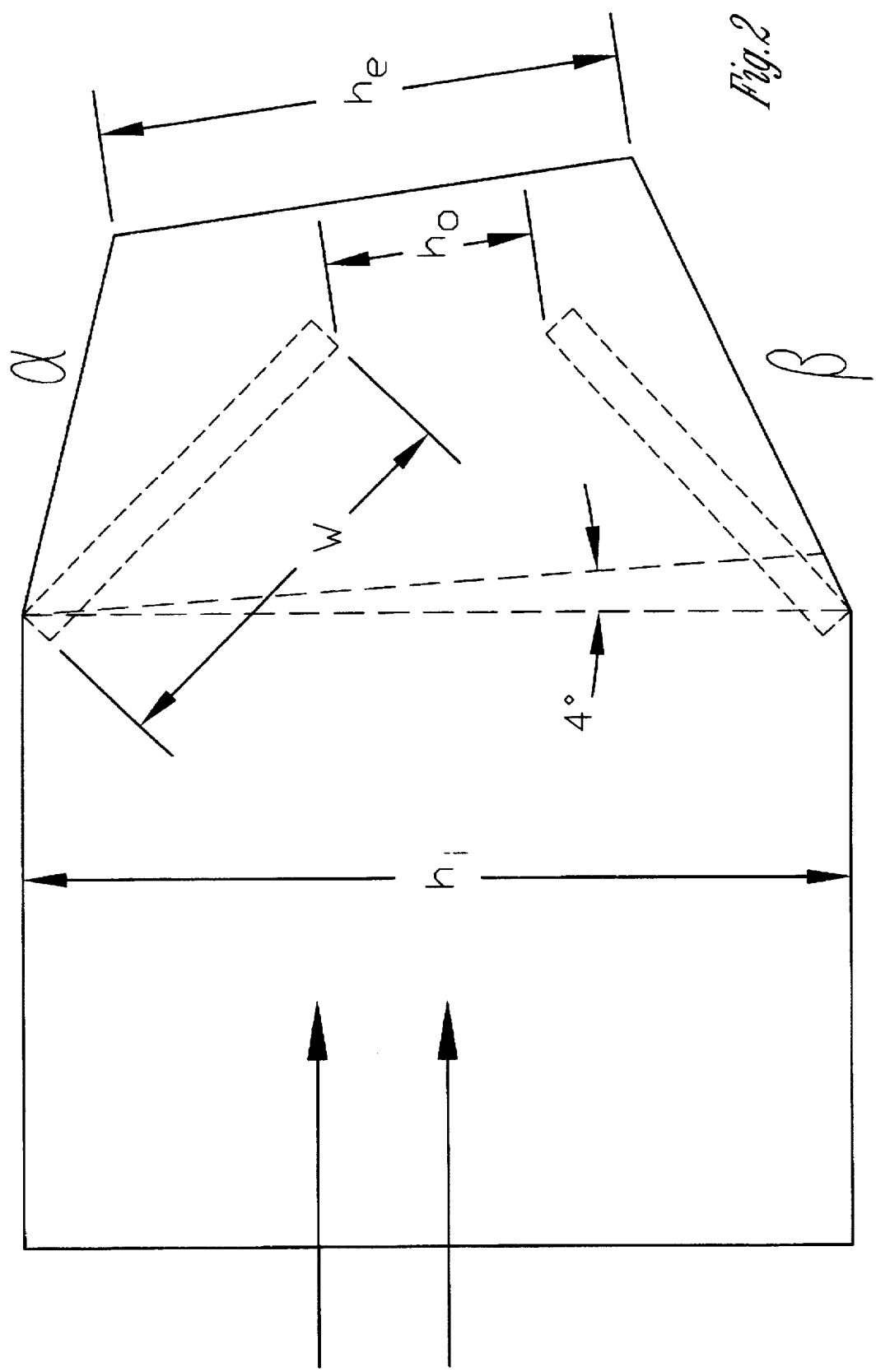

DUAL BAFFLE SYSTEM IN AUTOMATIC AIR INLETS FOR LIVESTOCK FACILITIES

BACKGROUND OF THE INVENTION

Negative pressure ventilation systems are widely used to distribute fresh air within a building. These systems introduce fresh outside air into a building by producing a pressure difference across an inlet. A common inlet design used in agricultural buildings is an automatic sidewall air inlet (SWAI). These inlets open automatically upon demand by the fan system. There are many types of commercially available SWAI, each designed differently in an attempt to attain high performance within a ventilation system.

SWAI performance can be evaluated by investigating air flow characteristics and distribution. Air flow characteristics include volumetric flow rate provided by an inlet and the average velocity of the air exiting the inlet. These characteristics are affected by the pressure difference across the inlet, the opening area, and the discharge coefficient of the inlet. The discharge coefficient is the fraction of the maximum possible flow rate that actually flows through the inlet and accounts for energy losses due to friction, turbulence, section changes, and entrance effects (Vennard and Street, 1982). Inlets with high discharge coefficients are more efficient in bringing air into a building.

Airflow distribution is affected by the air-jet path and penetration distance, the horizontal spread of the air, and the vertical spread of the air. Inlet parameters affecting air flow distribution include the average velocity of the air exiting the inlet and by inlet components such as deflecting vanes and deflecting baffles. Environmental factors such as rain and wind can affect the performance of an inlet. Properly designed hoods attached to the inlet can diminish external weather factors.

Agricultural buildings require inlets with different air flow characteristics and distribution depending on the size of the building, animal population density, and the time of year. The continuing challenge for engineers is to design inlets that will attain high overall performance for seasonal demand variations.

Most current SWAI consist of a single baffle which controls inlet opening size, using springs, counter weights, or the weight of the baffle itself, to vary the volumetric flow. Although these inlets have the ability to change their volumetric flow rate, most are unable to satisfy the seasonal variations in demand within typical operating static pressure differences.

These inlets also have problems in distributing the air properly in agricultural buildings. Many SWAI units operating at a static pressure difference of 12.4 Pa are unable to generate enough momentum to develop an effecive air-jet. Deflecting baffles, which are sometimes used with inlets to direct the exiting air towards the ceiling, force most of the exiting air to disperse horizontally and thus decrease the air-jet penetration distance.

Current baffle systems consist of only one baffle along with the use of springs or coutner-weights. These systems are unable to adequately contorl the direction in which the air is discharged from the inlet as the volumetric flow rate changes. These systems are also unable to satisfy seasonal variations in air flow demand without the adjustments of springs or counter-weights.

The principal object of this invention is to provide a SWAI which will satisfy the seasonal demand of volumetric flow rate without the need for post-factory adjustments.

SUMMARY OF THE INVENTION

The item invented is a dual baffle system which can be incorporated into automatic air inlets used in livestock facilities. This system consists of four different components: two baffles, spring, opening mechanisms, and stationary bracket. This baffle system is positioned inside an automatic air inlet. The two baffles are hinged at the top and bottom of the inlet respectively and the opening between the baffles is allowed to increase or decrease. The opening mechanism is connected to the bottom baffle and allowed to slip through the stationary bracket. These two components allow the two baffles to open and close simultaneously. The spring allows the system to open and close to maintain the desired flow rate through the inlet.

BRIEF DESCRIPTION OF THE DRAWINGS

FIG. 2 shows configuration of inlet design;

DESCRIPTION OF THE PREFERRED EMBODIMENT OF THE INVENTION

Figure 1:
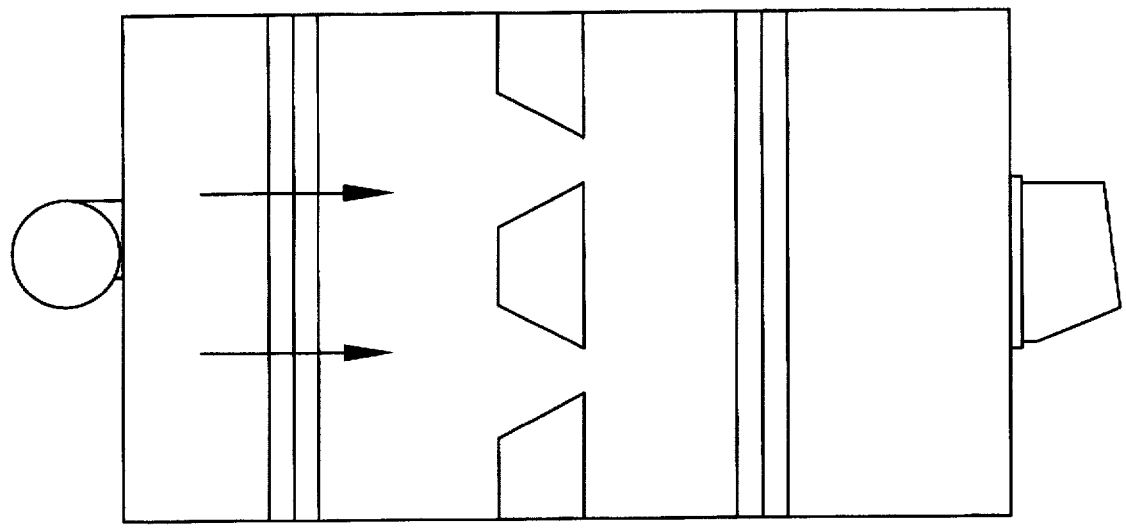
FIG. 1 shows a cross-section of air flow testing chamber having a width of 1.88 m.
Figure 1A:
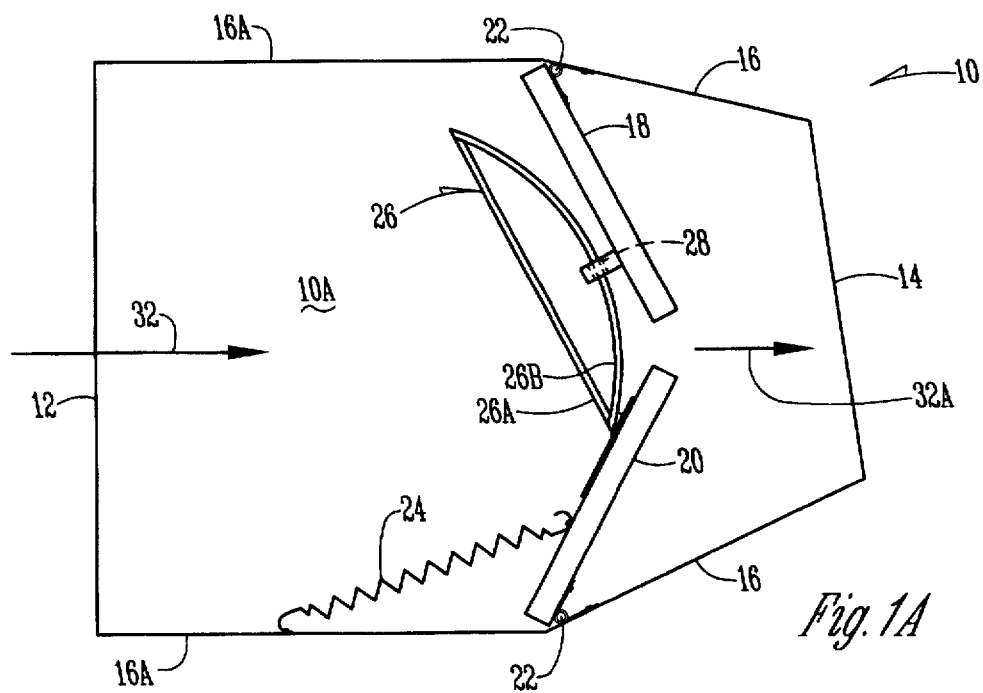
FIG. 1A is a vertical cross-section through the housing of this invention.

FIG. 1A shows the dual baffle system of this invention. The numeral 10 designates a housing having an open interior compartment 10A and an air flow inlet end 12 and an air flow exit end 14. The housing 10 can have sidewalls 16 which converge inwardly from parallel side walls 16A.

Upper baffle 18 and lower baffle 20 are hinged at 22 to pivot with respect to the housing. A spring 24 has its ends connected to the housing and lower baffle 20 respectively, to normally cause baffle 20 to pivot counterclockwise as seen in FIG. 1A. The baffles 18 and 20 have a length and width to close the compartment 10A to air flow when in a perpendicular position to side walls 16A.

A crescent shaped opening mechanism (strap) 26 having an outer edge 26A is rigidly secured by edge 26A in any convenient manner to baffle 20 so that mechanism 26 will pivot with lower baffle 20. The curved surface 26B slidably extends through slot 28 of U-shaped bracket 30 which is rigidly secured to upper baffle 18. Surface 26B determines the pivotal position of baffle 18. The curved surface 26B will slide through slot 28 as mechanism 26 is pivoted by baffle 20 so that baffles 18 and 20 will pivot in unison. Thus, when inlet air (arrow 32) moves against baffle 20, baffle 20 will rotate in a clockwise direction, as air moves between the baffles (arrow 32A). Spring 24 will move the baffles back towards a closed position when the inlet air flow is reduced.

The testing chamber is shown in FIG. 1. This chamber has the capability of measuring volumetric flow rate through fans and inlets as a function of static pressure difference through the use of variable speed fans, calibrated nozzles, pressure taps, and atmospheric measurements.

Each inlet tested was fitted with a 1.9 cm plywood frame for easy mounting to the test chamber (See FIG. 1). Mounting clamps and weather-stripping attached to the plywood frame ensured that all air passed through the test inlet. Barometric pressure, relative humidity, and dry bulb temperature were taken at the beginning of each run to correct airflow measurements to standard air conditions in accordance with ASHRAE Standard 70 (ASHRAE, 1991). Barometric pressure was measured using a Hygometer and Temperature Indicator, (Model HTAB-176; Abbean Cal., Inc). Static pressure differences were measured using micromanometers (Dwyer Instruments, Inc.) having scale divisions of 0.249 Pa (0.001 in. wg.). Air flow through the chamber was distributed over the entire cross section of the chamber by air flow straighteners, which are positioned in front of and behind the nozzles (FIG. 1).

Inlet Configurations

Several inlet configurations were constructed to test variations in inlet aspect ratio, weather hood design, and deflecting vane design. A constant inlet opening length (L) of 54.6 cm was used. This length was chosen because it is a common size used in industry and can be directly positioned in a stud wall 61.0 cm on center. A two baffle system in which the baffles open simultaneously to control the inlet opening height was chosen for analysis and is shown in FIG. 2. The components to the basic inlet are defined as follows:

α=angle between top of inlet housing and horizontal (degrees)
β=angle between bottom of inlet housing and horizontal (degrees)
$h_e$=inlet exit height (m)
$h_i$=inlet height (m)
$h_o$=inlet opening height (m)
w=baffle width (m)
L=inlet length (fixed at 54.6 cm)

The basic design also has a nozzle-like shape directed four degrees up from horizontal to direct the incoming air toward the ceiling (FIG. 2). Three inlets having inlet heights ($h_i$) of 50.0, 37.5 and 25.0 cm were designed and constructed for this research project. The dimensions of all three inlets are listed in Table 1 corresponding to the inlet shown in FIG. 2.

TABLE 1

Overall SWAI dimensions (see FIG. 2)

| Inlet | L (cm) | $h_i$ (cm) | β (degrees) | α (degrees) | w (cm) | $h_e$ (cm) |
|---|---|---|---|---|---|---|
| 1 | 54.6 | 50.0 | 26.0 | 18.0 | 27.0 | 30.0 |
| 2 | 54.6 | 37.5 | 25.0 | 17.0 | 20.0 | 23.3 |
| 3 | 54.6 | 25.0 | 23.0 | 13.0 | 13.0 | 16.6 |

Weather Hood Design

Figure 3:
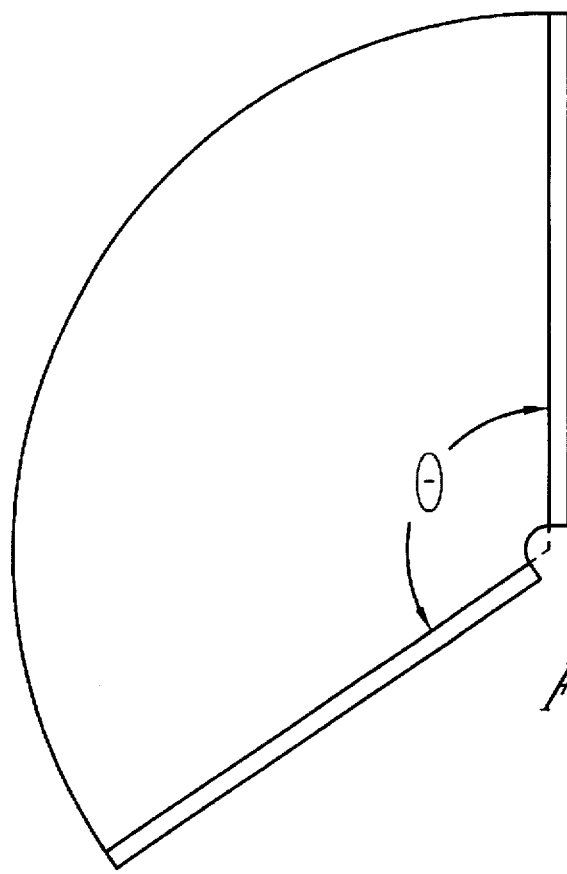
FIG. 3 shows configuration of hood design.

The basic hood design chosen for this research project is shown in FIG. 3. The angles of θ used were 0, 90, 120, 150 and 180 degrees. A hood angle of zero degrees signified an inlet without a hood. Each angle of hood was constructed for each inlet making a total of fifteen hoods.

Deflecting Vane Design

Figure 4B:
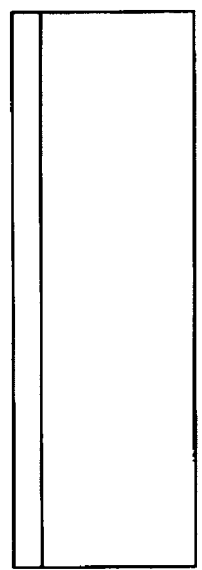
FIGS. 4A and 4B show configurations of deflecting vane designs.
Figure 4A:
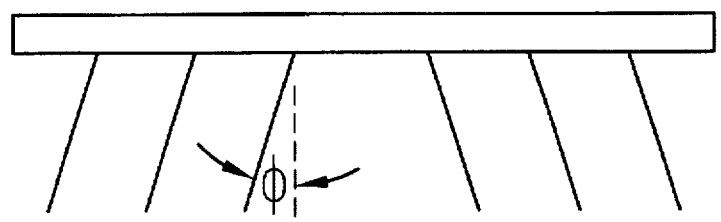

One method for controlling the divergence of an air-jet in the horizontal direction is to use deflecting vanes. ASHRAE (1993) recommends that deflecting vanes should have a vane ratio (depth of vane/distance between vanes) between one and two in order to have effective control of the exiting airstream. Based on this, six vanes were chosen as shown in FIG. 4. Four sets of vanes were constructed with the angle Φ ranging from 0 to 45 degrees. A zero vane deflection (Φ) implied that no vanes were used.

Actual Volumetric Flow Rate ($Q_a$)

The testing chamber was equipped with six calibrated nozzles that were used to calculate actual volumetric flow rate ($Q_a$) through the chamber. One 7.62 cm, two 15.24 cm, and three 20.32 cm nozzles were available. Various combinations of these nozzles were used at different flow rates. Actual volumetric flow rate ($Q_a$) was then calculated from the static pressure drop measured across calibrated chamber nozzles by using standardized relations (Shahan, 1985).

Maximum Volumetric Flow Rate ($Q_m$)

Maximum volumetric flow rate ($Q_m$) through an opening is derived from the Bernoulli equation for steady flow of inviscid, incompressible fluids at constant elevations (Vennard and Street, 1982):

$$Q_m = A_o \sqrt{\frac{2\Delta P}{\rho}} \tag{1}$$

where
$Q_m$=maximum volumetric flow rate (m³/s)
$A_o$=opening area of inlet determined by opening height ($h_o$) and opening length (L), (m²) (see FIG. 2)
ρ=density of air (kg/m³)
P=change in static pressure across inlet (Pa)

Discharge Coefficient ($C_d$)

The discharge coefficient ($C_d$) is calculated using the ratio between actual volumetric flow rate ($Q_a$) and maximum volumetric flow rate ($Q_m$)(Munson et al. 1990):

$$C_d = Q_a/Q_m \tag{2}$$

and represents the inefficiencies associated with friction and turbulence as air travels through the inlet (Munson et al. 1990).

Dimensional Analysis

To minimize the number of tests required, dimensional analysis was used to form dimensionless combinations of variables. Volumetric flow rate through the inlet was assumed to be a function of:

$$Q_a = f(\Delta P, L, h_o, \theta, \Phi, h_i, \rho, \mu) \tag{3}$$

which is similar to that proposed by Albright (1976) except for the addition of θ and Φ, representing the hood and deflecting vane angles, respectively.

Restricting this study to the variables in Eq. 3 required the assumptions that; the air is incompressible, there are no significant temperature (buoyancy) effects, the surface roughness may be neglected, and the baffle thickness does not significantly affect the airflow.

The primary variables in Eq. 3 can be formed into the following relationship of dimensionless terms:

$$\pi_1 = f(\pi_2, \pi_3, \pi_4, \pi_5, \pi_6) \quad (4)$$

with; $\pi_1 = Q_a\rho/\mu h_i$ (volumetric flow rate term), $\pi_2 = \Delta P h_i^2 \rho/\mu^2$ (static pressure difference term), $\pi_3 = L/h_i$ (housing aspect ratio), $\pi_4 = h_o/h_i$ (inlet opening ratio), $\pi_5 = \theta$ (weather hood angle), and $\pi_6 = \Phi$ (deflecting vane angle).

The information contained in $\pi_1$ and $\pi_2$ includes the inlet Reynolds number, Re (Albright, 1976) as shown in the following equations:

$$\pi_1 = \frac{Q_a\rho}{\mu h_i} = \frac{V_a A_a \rho}{\mu h_i} = \frac{V_a \rho}{\mu}\left(\frac{h_o L}{h_i}\right) = Re \quad (5)$$

$$\pi_2 = \frac{\Delta P h_i^2 \rho}{\mu^2} = \frac{\Delta P}{\rho V_a^2}\left(\frac{\rho h_i V_e}{\mu}\right)^2 = \frac{1}{2C_v^2} Re^2 \quad (6)$$

where $C_v$ is the coefficient of velocity, defined as the radio of average air velocity to ideal velocity at the inlet exit $(C_v = V_a/(2\Delta P/\rho)^{1/2}$ Experimental Procedure There were two major parts to the experimental procedure. The first part uses the dimensional analysis approach to decide the importance of each dimensionless Pi term. Extreme values of Pi terms were calculated, tested, and compared with each other to analyze the significance of each on the discharge coefficient and volumetric flow rate. The second part investigates the actual average discharge coefficient as a function of the significant inlet parameters. Each procedure is briefly described below.

Dimensional Analysis Procedure

The extreme values and ranges of Pi terms used in this procedure are listed in Table 2. Terms $\pi_3$ through $\pi_6$ were completely independent; however $\pi_2$ was dependent on the static pressure difference ($\Delta P$) tested and on atmospheric conditions because of density and viscosity in the term. Therefore, $\pi_2$ had a range of values (Table 2); $\pi_1$ also had a range of values (Table 2) because of its dependent on all other inlet parameters as shown in Eq. 5.

TABLE 2

Values and ranges of Pi terms (dimensional analysis procedure)

| Independent Pi Terms | | | | |
|---|---|---|---|---|
| $\pi_3$ (L/h$_i$) | 1.09 | 1.46 | 2.18 | |
| $\pi_4$ (h$_o$/h$_i$) | 0.13 | 0.25 | 0.38 | 0.50 |
| $\pi_5$ ($\theta$) | 0. | 90. | 180. | |
| $\pi_6$ ($\Phi$) | 0. | 45. | | |

| Dependent Pi Terms | |
|---|---|
| $\pi_1$ (Q$\rho$/$\mu$h$_i$) | $1.4 \times 10^4$ to $1.1 \times 10^6$ |
| $\pi_2$ ($\Delta$Ph$_i^2$ $\rho/\mu^2$) | $2.1 \times 10^9$ to $2.6 \times 10^{10}$ |

The values and ranges of Pi terms were dependent on the values and ranges of the parameters within them. Both the independent and dependent parameters used are listed in Table 3. In order for $\pi_4$ to only have four unique values, the values of inlet opening height (h$_o$) needed to be different for each inlet height, h$_i$, as denoted in Table 3.

TABLE 3

Values and ranges of inlet parameters

| | | Independent Parameters | | | | |
|---|---|---|---|---|---|---|
| $\Delta P$ | Pa | 9.9 | 14.9 | 19.8 | 24.8 | 29.7 |
| h$_i$ | cm | 25.0 | 37.5 | 50.0 | | |
| h$_o$ when h$_i$ = 25.0 | cm | 3.1 | 6.3 | 9.4 | 12.5 | |
| h$_o$ when h$_i$ = 37.5 | cm | 4.7 | 9.4 | 14.1 | 18.8 | |
| h$_o$ when h$_i$ = 50.0 | cm | 6.3 | 12.5 | 18.8 | 25.0 | |
| $\theta$ | degrees | 0. | 90. | 180. | | |
| $\Phi$ | degrees | 0. | 45. | | | |
| L | cm | | | 54.6 | | |

| | Dependent Parameters | |
|---|---|---|
| Q | m$^3$/s | 0.06 to 0.84 |
| $\rho$ | kg/m$^3$ | 1.17 to 1.21 |
| $\mu$ | N-s/m$^2$ | $1.85 \times 10^{-5}$ |

Each combination of $\pi_3$ through $\pi_6$ was tested at each of the static pressure differences ($\Delta P$) listed in Table 3. The air density, $\rho$, and viscosity, $\mu$, were measured during the experimental calculation for volumetric flow rate, $Q_a$, which were all used to calculate $\pi_1$ and $\pi_2$. Two runs were completed for the entire procedure. The total number of inlet configurations tested for volumetric flow rate was 72 ($2\pi_6*3\pi_5*4\pi_4*3\pi_3$). Term $\pi_2$ was tested at 5 levels corresponding to the 5 $\Delta P$ levels and 2 runs of each treatment were conducted for a total of 720 data points (72*5*2).

Actual Discharge Coefficient Procedure

The dimensional analysis procedure, described previously, was used to determine the significance of each Pi term. The ultimate objective of this research was to develop a series of design guidelines for $C_d$ as a function of each inlet parameter. Therefore, for each Pi term that was a significant contributor to changes in $C_d$, further analysis was performed, at intermediate Pi term levels, to develop specific $C_d$ trends. This procedure will be described in more detail in the results and discussion section.

RESULTS AND DISCUSSION

Dimensional Analysis Procedure

Figure 5:
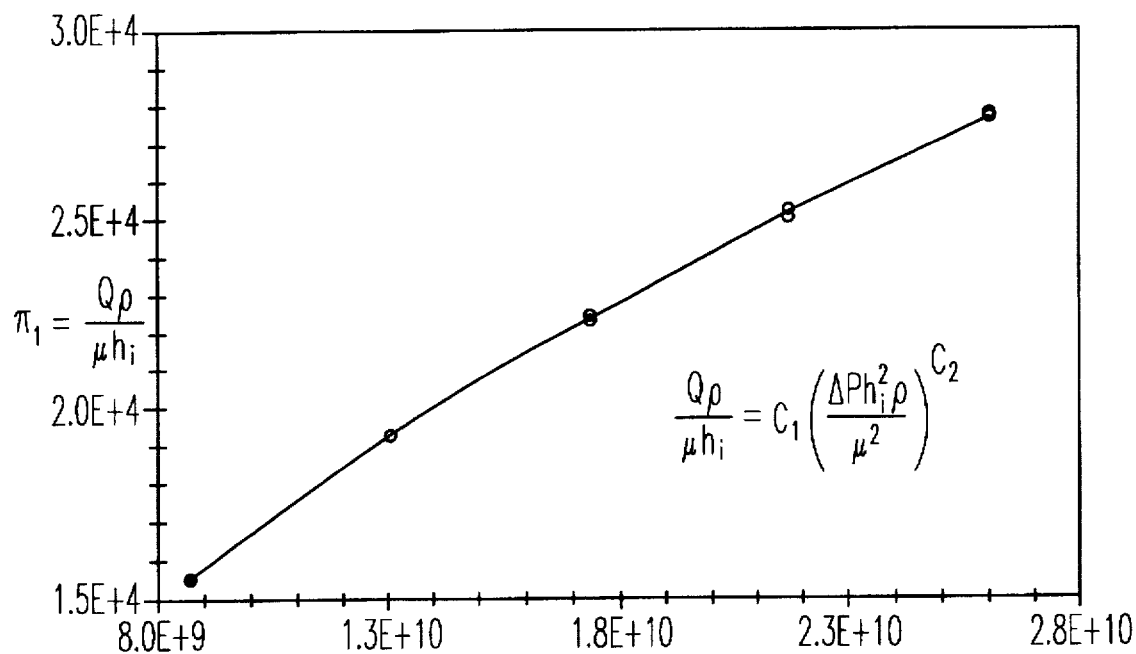
FIG. 5 shows an example of correlation used in dimensional analysis approach.
Figure 6:
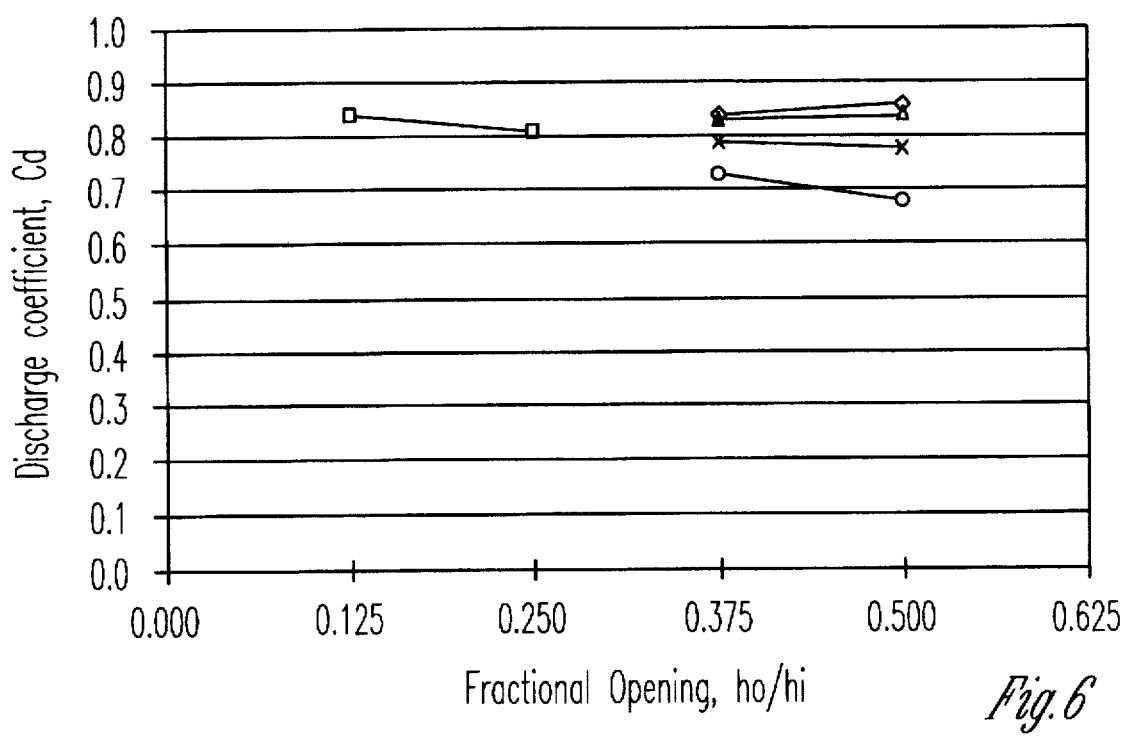
FIG. 6 shows average discharge coefficients for a hood angle of 0 degrees.
Figure 7:
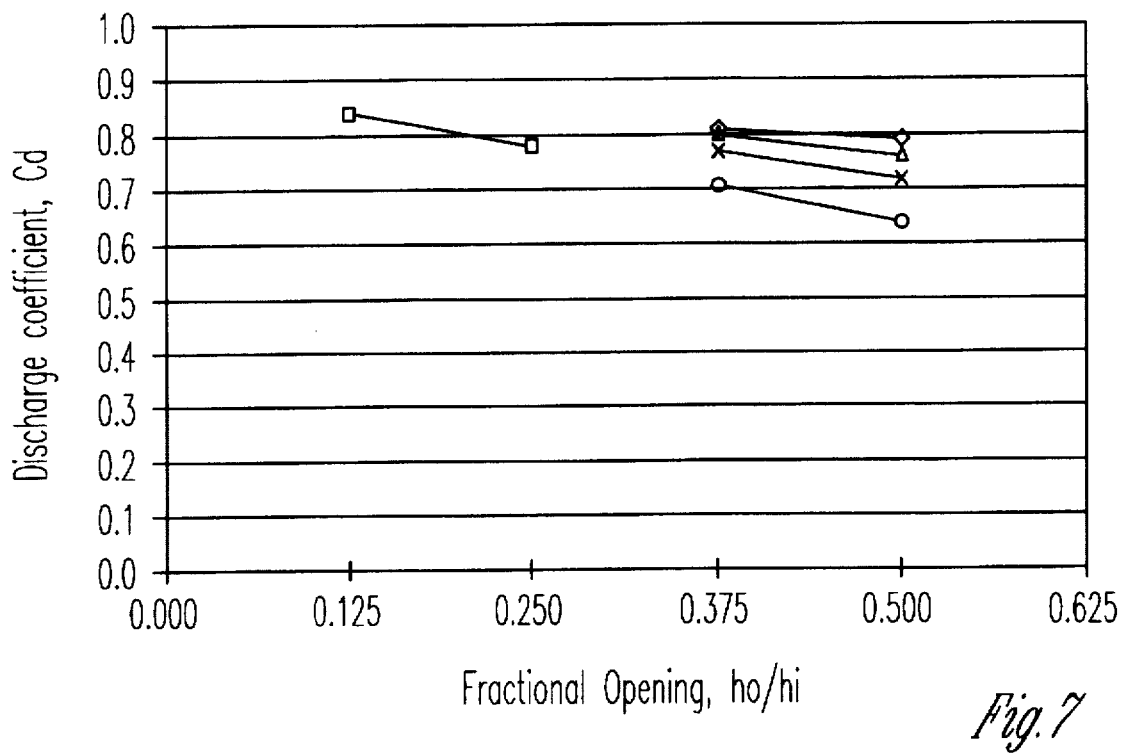
FIG. 7 shows average discharge coefficients for a hood angle of 90 degrees.
Figure 8:
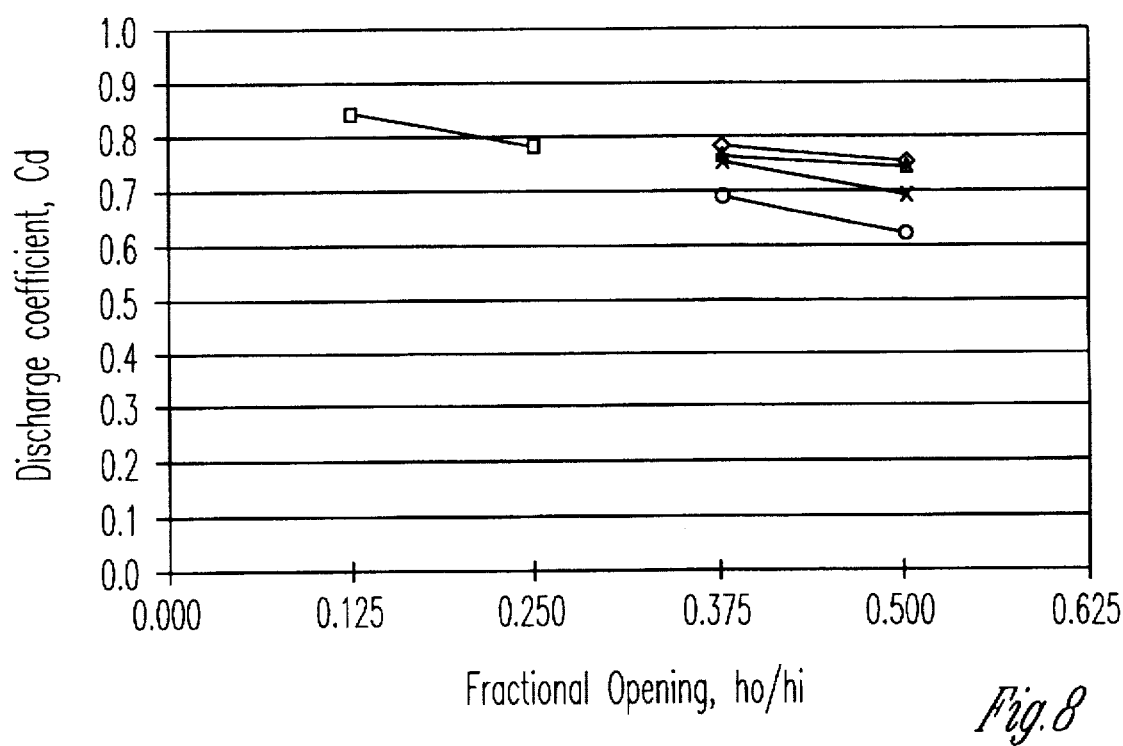
FIG. 8 shows average discharge coefficients for a hood angle of 120 degrees.
Figure 9:
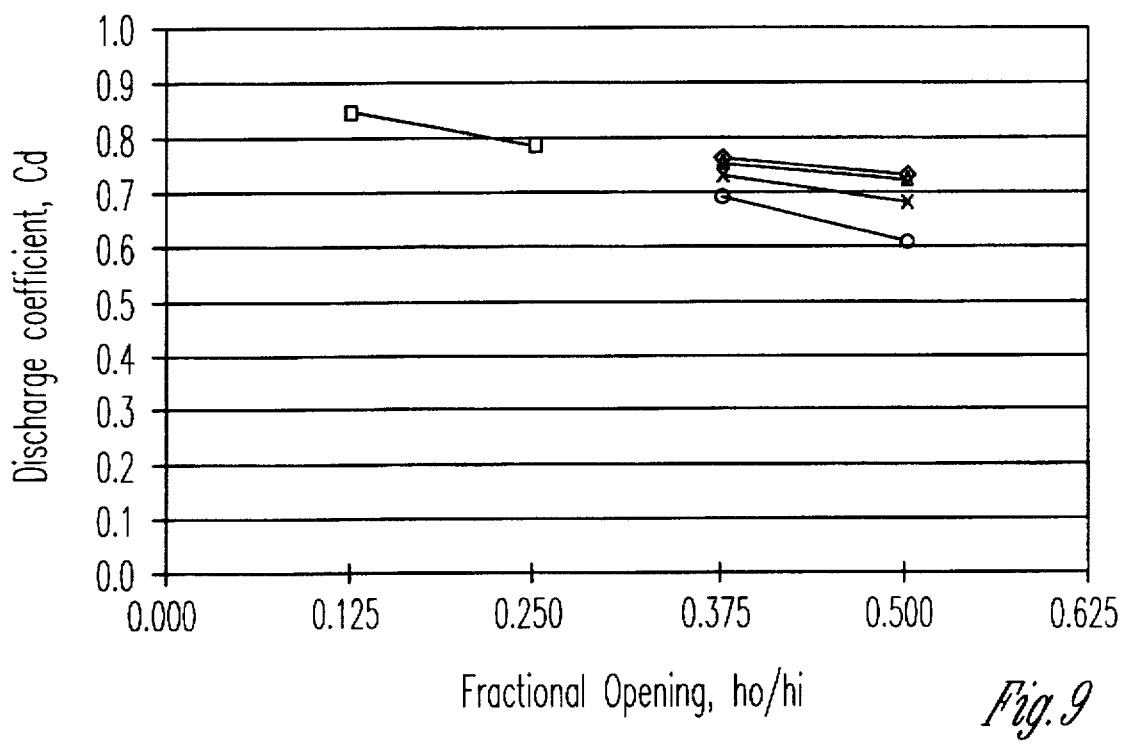
FIG. 9 shows average discharge coefficients for a hood angle of 150 degrees.
Figure 10:
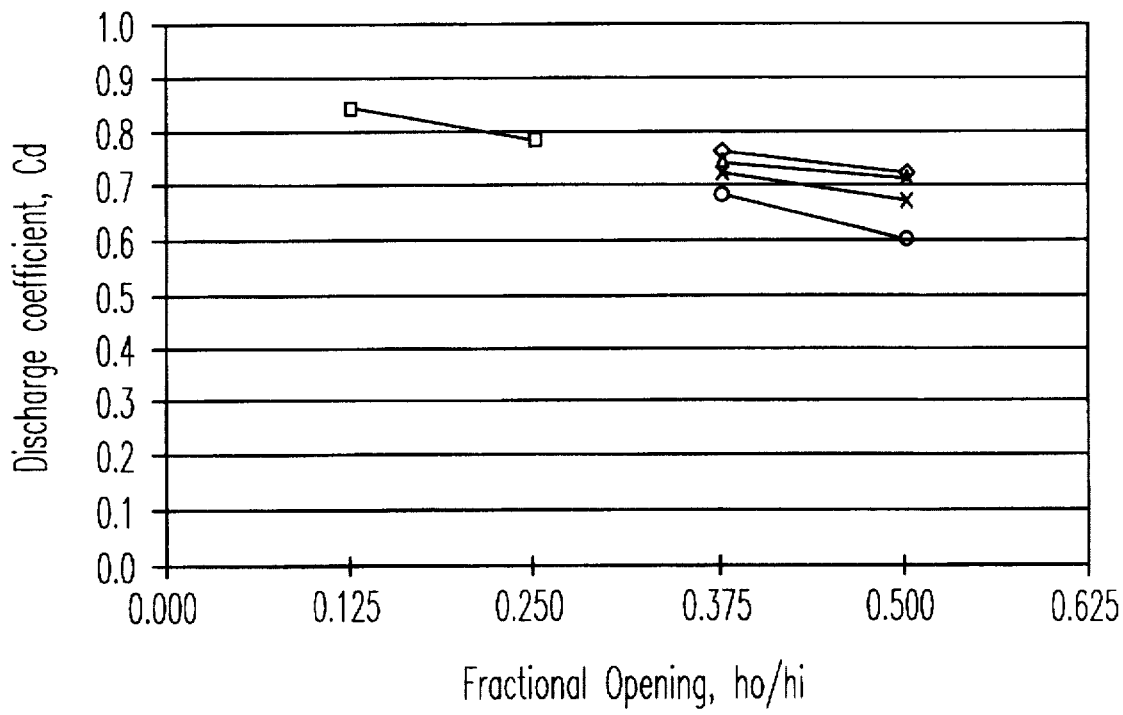
FIG. 10 shows average discharge coefficients for a hood angle of 180 degrees.

Using the results from the dimensional analysis procedure, plots were made of $\pi_1$ versus $\pi_2$ for each combination of $\pi_3$, $\pi_4$, $\pi_5$ and $\pi_6$. A total of seventy-two plots, including both experimental runs, were generated. Each plot resembled the graph shown in FIG. 5. The data on each graph was fitted to a power correlation using constants C1 and C2 as shown in FIG. 5. Each correlation had a correlation coefficient ($R^2$) of 0.99 or greater. In lieu of generating all 72 plots, a summary table was developed indicating the constants C1 and C2 (not shown). This summary table indicated that all of the C2 constants were very close to 0.5. This was reasonable because the theoretical velocity is found using the static pressure difference ($\Delta P$) raised to the 0.5 power.

A simplification procedure was followed to estimate the discharge coefficient from each Pi term combination. The first step was to break up each equation applying the C2 constant to each parameter in the $\pi_2$ term. For example, a typical result from this procedure included the line items shown below:

| $\pi_3 = L/h_i$ | $\pi_4 = h_o/h_i$ | $\pi_5 = \theta$ | $\pi_6 = \Phi$ | C1 | C2 |
|---|---|---|---|---|---|
| 2.18 | 0.13 | 0. | 0. | 0.3034 | 0.5037 |

Applying C1 and C2 to the generalized equation shown in FIG. 5 results in:

$$\frac{Q_a \rho}{\mu h_i} = 0.3034 \frac{\Delta P^{0.5037} h_i^{1.0074} \rho^{0.5037}}{\mu^{1.0074}} \quad (7)$$

and substituting values for dynamic viscosity (μ) and density (ρ) yields:

$$Q_a = 0.30 \Delta P^{0.5037} h_i^{2.0074} \quad (8)$$

To compare equations from each of the generated 72 graphs, the next step was to assume the power of the static pressure difference (ΔP) was 0.5 and the power of the inlet height ($h_i$) was 2.0. These approximations seem to be fairly good because the error associated with each approximation tends to cancel each other. Also if the inlet height is substituted for one of the $h_i$'s and the inlet opening ratio ($h_o/h_i$) is substituted, an equation will result that will be in terms of static pressure difference and opening height:

$$Q_a = 0.60 \Delta P^{0.50} h_o \quad (9)$$

The last step was to substitute in the opening length (L) and density (ρ) to arrange the equation in terms of discharge coefficient ($C_d$), theoretical velocity ($V_t$) and opening area ($A_o$). The resulting equation was:

$$Q_a = 0.851 \sqrt{\frac{2\Delta P}{\rho}} \, h_o L \quad (10)$$

which has the generalized form of:

$$Q_a = C_d A_o V_t \quad (11)$$

where
$C_d$=discharge coefficient (dimensionless)
$A_o$=inlet opening area ($L \ast h_o$)($m^2$)
$V_t$=theoretical velocity (($2\Delta P/\rho)^{1/2}$)(m/s)

If this procedure is followed for each graph of the form shown in FIG. 5 (72 total), the approximate discharge coefficient, averaged across $\pi_2$, can be compared for each combination of $\pi_3$, $\pi_4$, $\pi_5$ and $\pi_6$ terms.

Upon analysis of these results, it was found that the discharge coefficient remained fairly constant as $\pi_3$ changed ($\pi_4$, $\pi_5$, and $\pi_6$ constant) but varied greatly as $\pi_4$, $\pi_5$, and $\pi_6$ terms changed. These results imply that the parameters significantly affecting the discharge coefficient were the inlet opening ratio ($h_o/h_i$), the weather hood angle (θ) and the deflecting vane angle (Φ). Table 4 summarizes the approximate discharge coefficient as a function of $\pi_4$, $\pi_5$ and $\pi_6$. The results are averaged across the three levels of $\pi_3$.

TABLE 4

Approximate $C_d$ values averaged across $\pi_3$ using dimensional analysis approach

| | θ = 0<br>Φ = 0 | θ = 0<br>Φ = 45 | θ = 90<br>Φ = 0 | θ = 90<br>Φ = 45 | θ = 180<br>Φ = 0 | θ = 180<br>Φ = 45 |
|---|---|---|---|---|---|---|
| $h_o/h_i = 0.13$ | 0.83 | 0.85 | 0.81 | 0.82 | 0.81 | 0.83 |
| $h_o/h_i = 0.25$ | 0.81 | 0.80 | 0.78 | 0.77 | 0.79 | 0.77 |
| $h_o/h_i = 0.38$ | 0.84 | 0.73 | 0.82 | 0.72 | 0.77 | 0.69 |

TABLE 4-continued

Approximate $C_d$ values averaged across $\pi_3$ using dimensional analysis approach

| | θ = 0<br>Φ = 0 | θ = 0<br>Φ = 45 | θ = 90<br>Φ = 0 | θ = 90<br>Φ = 45 | θ = 180<br>Φ = 0 | θ = 180<br>Φ = 45 |
|---|---|---|---|---|---|---|
| $h_o/h_i = 0.50$ | 0.86 | 0.66 | 0.81 | 0.64 | 0.72 | 0.60 |

Table 4 indicates that the estimated $C_d$ is considerably reduced with a deflecting vane angle of Φ=45 as the inlet opening ratio increases. For example, for a weather hood of θ=90 degrees, $C_d$ is reduced from 0.82 at $h_o/h_i$=0.13 to 0.64 at $h_o/h_i$=0.50. At small inlet opening ratios ($h_o/h_i$=0.13 or 0.25), little estimated effect from either weather hoods or deflecting vanes was found. As the inlet is opened though, the predominant restriction to airflow is found from the deflecting vanes as evidenced by the substantial reduction in $C_d$ levels with and without the deflecting vanes present. For weather hoods of 0, 90, and 180 degrees, the estimated $C_d$ levels were reduced by 23.3, 21.0, and 16.7 percent, respectively, when a 45 degree deflecting vane was installed.

Discharge Coefficient Analysis

Using the dimensional analysis approach an average discharge coefficient could be estimated as summarized in Table 4. This average discharge coefficient was found by approximating and averaging constants within correlations to simplify and group the results. The dimensional analysis results indicated that the volumetric flow rate could be predicted using a series of discharge coefficients, and that the variation in discharge coefficient was predominately a function of the inlet parameters contained within the dimensionless parameters $\pi_4$, $\pi_5$, and $\pi_6$.

To satisfy the objectives of this research, the actual average discharge coefficient was determined using Eq. 2 ($C_d = Q_a / Q_m$) for all inlet parameter combinations, to allow for an easy prediction of volumetric flow rate using Eq. 12 ($Q_a = C_d A_o V_t$) requiring only a knowledge of how $C_d$ varies as a function of inlet parameters. For example, using the parameters of the previous section, the actual discharge coefficient (Eq. 2) was calculated for each point tested in the dimensional analysis approach and averaged within each combination of $\pi_4$, $\pi_5$, and $\pi_6$ terms. The results are shown in Table 5.

TABLE 5

Average $C_d$ (S.D.) values derived from Eqn. 2 (N = 30)

| | θ = 0<br>Φ = 0 | θ = 0<br>Φ = 45 | θ = 90<br>Φ = 0 | θ = 90<br>Φ = 45 | θ = 180<br>Φ = 0 | θ = 180<br>Φ = 45 |
|---|---|---|---|---|---|---|
| $h_o/h_i = 0.13$ | 0.84 | 0.85 | 0.83 | 0.84 | 0.83 | 0.84 |
| | (0.04) | (0.04) | (0.04) | (0.04) | (0.03) | (0.04) |
| $h_o/h_i = 0.25$ | 0.81 | 0.80 | 0.79 | 0.78 | 0.78 | 0.78 |
| | (0.01) | (0.02) | (0.01) | (0.01) | (0.01) | (0.02) |
| $h_o/h_i = 0.38$ | 0.84 | 0.73 | 0.81 | 0.71 | 0.76 | 0.68 |
| | (0.01) | (0.03) | (0.01) | (0.03) | (0.01) | (0.02) |
| $h_o/h_i = 0.50$ | 0.86 | 0.68 | 0.79 | 0.64 | 0.72 | 0.60 |
| | (0.01) | (0.02) | (0.01) | (0.02) | (0.01) | (0.02) |

Table 5 represents the actual discharge coefficient for all $\pi_4$, $\pi_5$, and $\pi_6$ combinations tested in the dimensional analysis approach. In comparison, Table 4 represents the approximate $C_d$ values as determined using the dimensional analysis approach. Although several assumptions were used to develop Table 4, the $C_d$ values estimated were very close to the actual $C_d$ values listed in Table 5. The maximum difference in approaches was −2.94% for $\pi_4$=0.50, $\pi_5$=0 degrees and $\pi_6$=45 degrees.

Further analysis of Table 5 shows that the average discharge coefficient remained nearly constant for certain situations. With an inlet opening ratio ($h_o/h_i$) of 0.13 the average discharge coefficient remained nearly constant at 0.84 (0.04) for hood angles (θ) of 90 and 180 degrees and 0.85 (0.04) for a weather hood angle (θ) of 0 regardless of the deflecting vane angle (Φ). The same conclusion can be made for an inlet opening ratio ($h_o/h_i$) of 0.25 except that the average discharge coefficient was 0.78 (0.01) for weather hood angles (θ) of 90 and 180 degrees and 0.81 (0.02) for a weather hood angle (θ) of 0.

Hood angles (θ) that would typically be used are 0 and 90 degrees. If the inlet is positioned between rooms or used with an adjacent pre-tempering hallway, then there is no need for a hood to protect it from environmental factors. However, if the inlet is placed in an outer wall exposed to the outside then a hood with an angle (θ) of 90 to 180 degrees would be required.

The assumption was made that the discharge coefficient at θ=0 degrees was constant at 0.85 (0.04) and 0.81 (0.02) for inlet opening ratios ($h_o/h_i$) of 0.13 and 0.25, respectively, regardless of the deflecting vane angle Φ. Similarly, the assumption was made that the discharge coefficient between θ=90 and 180 degrees was constant at 0.84 (0.04) and 0.78 (0.01) for inlet opening ratios ($h_o/h_i$) of 0.13 and 0.25, respectively, regardless of the deflecting vane angle Φ. These assumptions were based on the results presented and described in Table 5.

The above stated assumptions could not, however, be enforced at inlet opening ratios of 0.38 and 0.50 as clearly identified in Table 5. To complete the discharge coefficient analysis, additional testing for intermediate values of θ and Φ for inlet opening ratios ($h_o/h_i$) of 0.38 and 0.50 was conducted. Deflecting vane angles (Φ) of 15 and 30 degrees were tested with weather hood angles (θ) of 0, 90 and 180 degrees and deflecting vane angles (Φ) of 0, 15, 30, and 45 degrees were tested with weather hood angles (θ) of 120 and 150 degrees.

Because the initial experimental procedure produced very small percent errors when testing for the average actual discharge coefficient, a new experimental procedure was developed that required fewer test points. The new procedure only tested at static pressure differences of 14.87 and 24.78 Pa for each inlet height ($h_i$) with no replication. Therefore instead of using 30 data points to find an average discharge coefficient for each combination of inlet opening ratio ($h_o/h_i$), weather hood angle (θ), and deflecting angle (Φ), only 6 data points were used (2ΔP*3$h_i$=6 data points). The results from this additional testing are summarized in Tables 6 and 7 along with the standard deviation for each average discharge coefficient. The results from previous testing is also listed for completeness.

TABLE 6

Further $C_d$ values with inlet opening ratio of 0.38

|   | Φ = 0 | Φ = 15 | Φ = 30 | Φ = 45 |
|---|---|---|---|---|
| θ = 0 | 0.84* | 0.83 | 0.79 | 0.73* |
|   | (0.01) | (0.01) | (0.01) | (0.03) |
| θ = 90 | 0.81* | 0.80 | 0.77 | 0.71* |
|   | (0.01) | (0.01) | (0.01) | (0.03) |
| θ = 120 | 0.78 | 0.76 | 0.75 | 0.69 |
|   | (0.01) | (0.01) | (0.01) | (0.02) |
| θ = 150 | 0.76 | 0.75 | 0.73 | 0.69 |
|   | (0.01) | (0.01) | (0.01) | (0.02) |
| θ = 180 | 0.76* | 0.74 | 0.72 | 0.68* |
|   | (0.01) | (0.01) | (0.01) | (0.02) |

TABLE 6-continued

Further $C_d$ values with inlet opening ratio of 0.38

| Φ = 0 | Φ = 15 | Φ = 30 | Φ = 45 |
|---|---|---|---|

*30 data points used to determine average from dimensional analysis procedure (numbers without a superscript were the average of 6 data points from die, discharge coefficient analysis procedure)

TABLE 7

Further $C_d$ values with inlet opening ratio of 0.50

|   | Φ = 0 | Φ = 15 | Φ = 30 | Φ = 45 |
|---|---|---|---|---|
| θ = 0 | 0.86* | 0.84 | 0.78 | 0.68* |
|   | (0.01) | (0.01) | (0.01) | (0.02) |
| θ = 90 | 0.79* | 0.76 | 0.72 | 0.64* |
|   | (0.01) | (0.01) | (0.01) | (0.02) |
| θ = 120 | 0.75 | 0.74 | 0.69 | 0.62 |
|   | (0.01) | (0.01) | (0.01) | (0.02) |
| θ = 150 | 0.73 | 0.72 | 0.68 | 0.61 |
|   | (0.01) | (0.01) | (0.01) | (0.02) |
| θ = 180 | 0.72* | 0.71 | 0.67 | 0.60* |
|   | (0.01) | (0.01) | (0.01) | (0.02) |

*30 data points used to determine average from dimensional analysis procedure (numbers without a superscript were the average of 6 data points from the discharge coefficient analysis procedure)

Graphs were made for each of the five different weather hood angles (θ). Plots were made of average actual discharge coefficient versus inlet opening ratio ($h_o/h_i$) for each deflecting vane angle (Φ). If the assumption is made that the average discharge coefficient changes linearly between inlet opening ratios of 0.13 and 0.25, and also between inlet opening ratios of 0.38 and 0.50, for each deflecting vane angle (Φ) the resulting graphs are those shown in FIGS. 6 through 10.

After looking at the graphs the main question left answered is how the average discharge coefficient changes as the inlet opening ratio ($h_o/h_i$) changes between 0.25 and 0.38.

Figure 11:
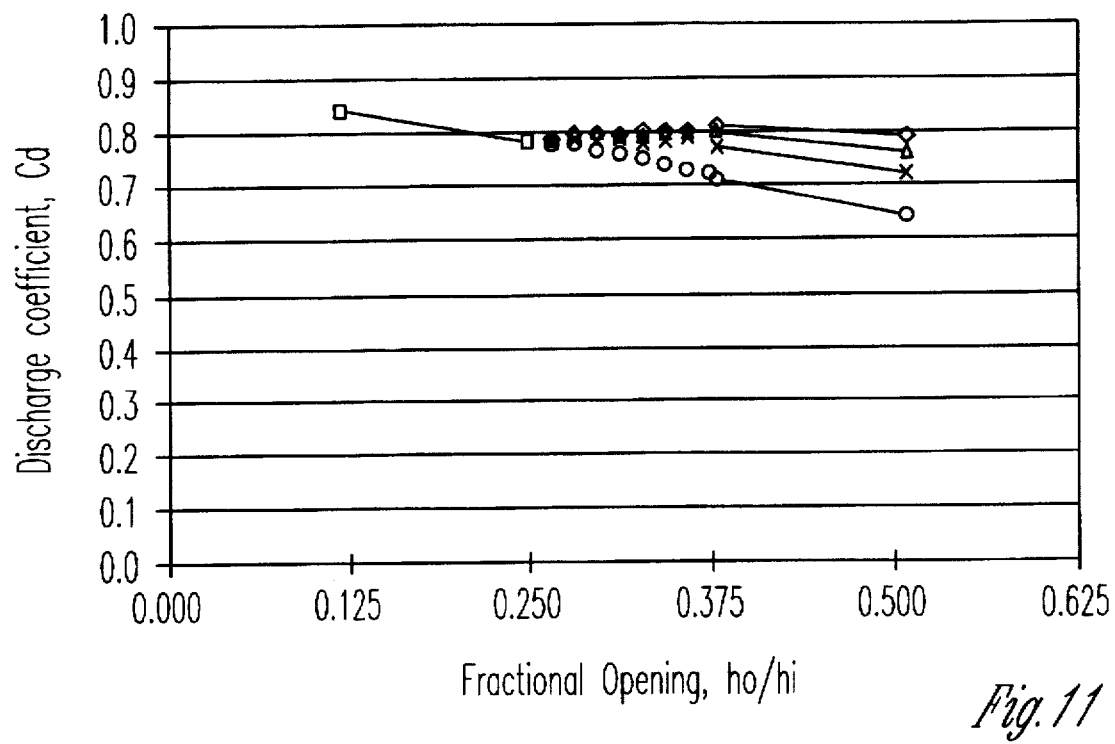
FIG. 11 shows additional data points for a hood angle of 90 degrees.
Figure 12:
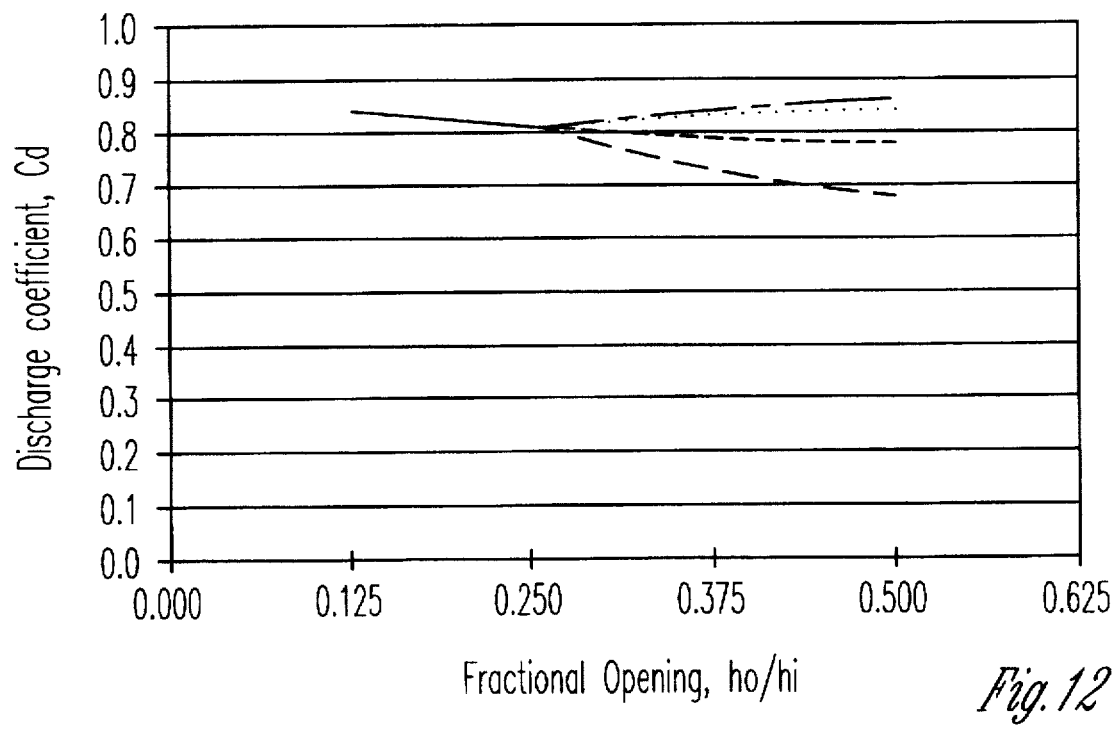
FIG. 12 shows final discharge coefficients for a hood angle of 0 degrees.
Figure 13:
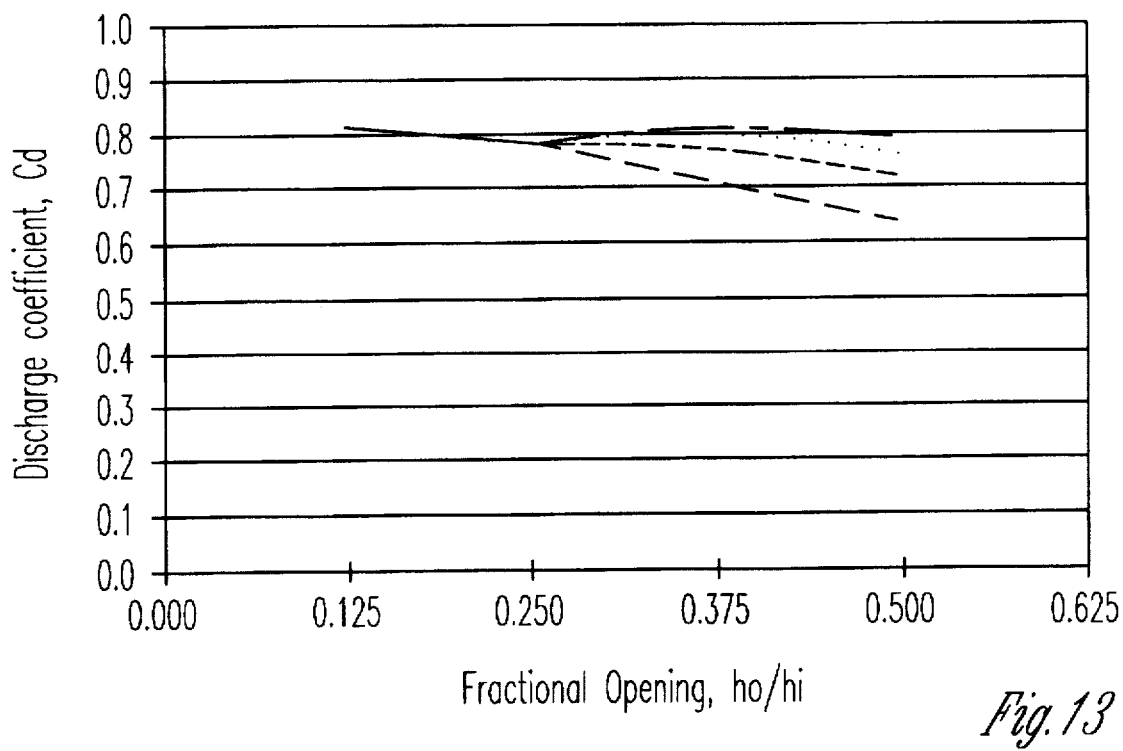
FIG. 13 shows final discharge coefficients for a hood angle of 90 degrees.
Figure 14:
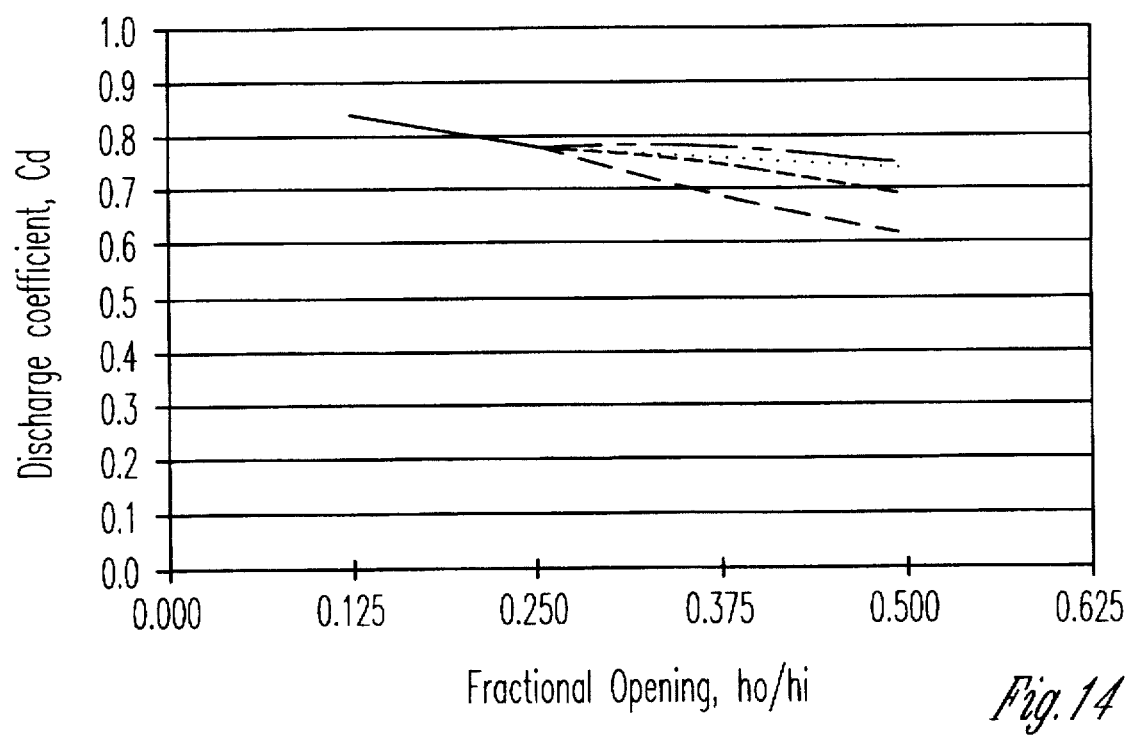
FIG. 14 shows final discharge coefficients for a hood angle of 120 degrees.
Figure 15:
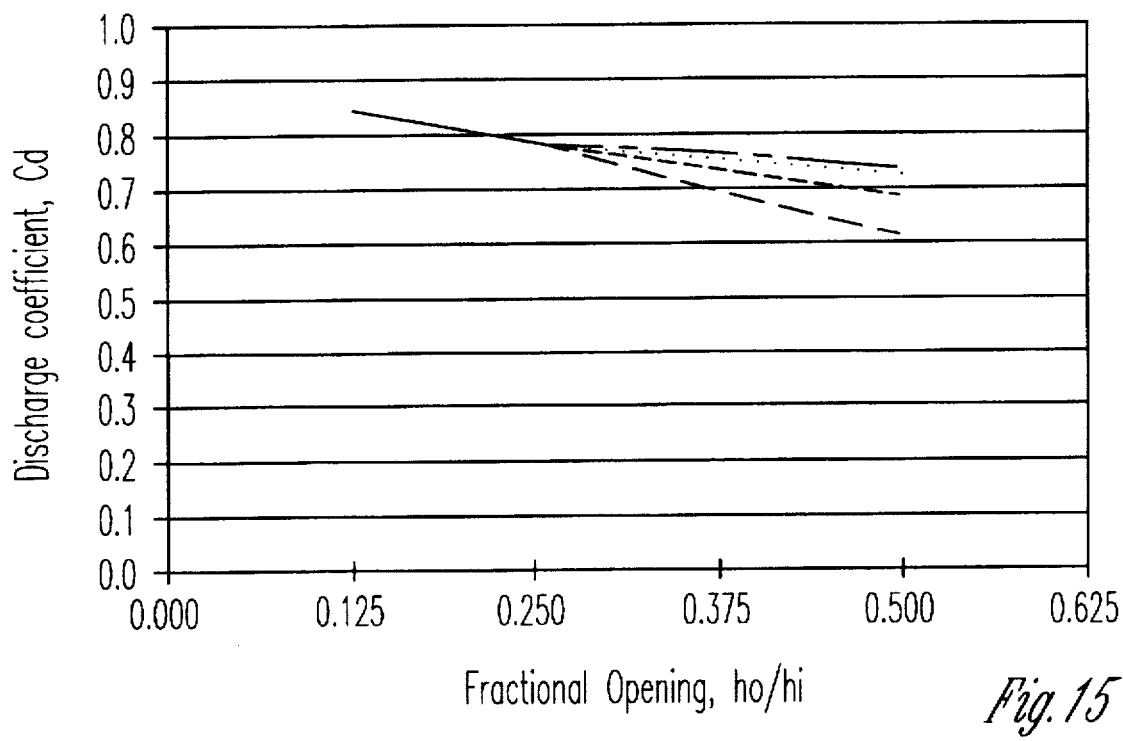
FIG. 15 shows final discharge coefficients for a hood angle of 150 degrees.
Figure 16:
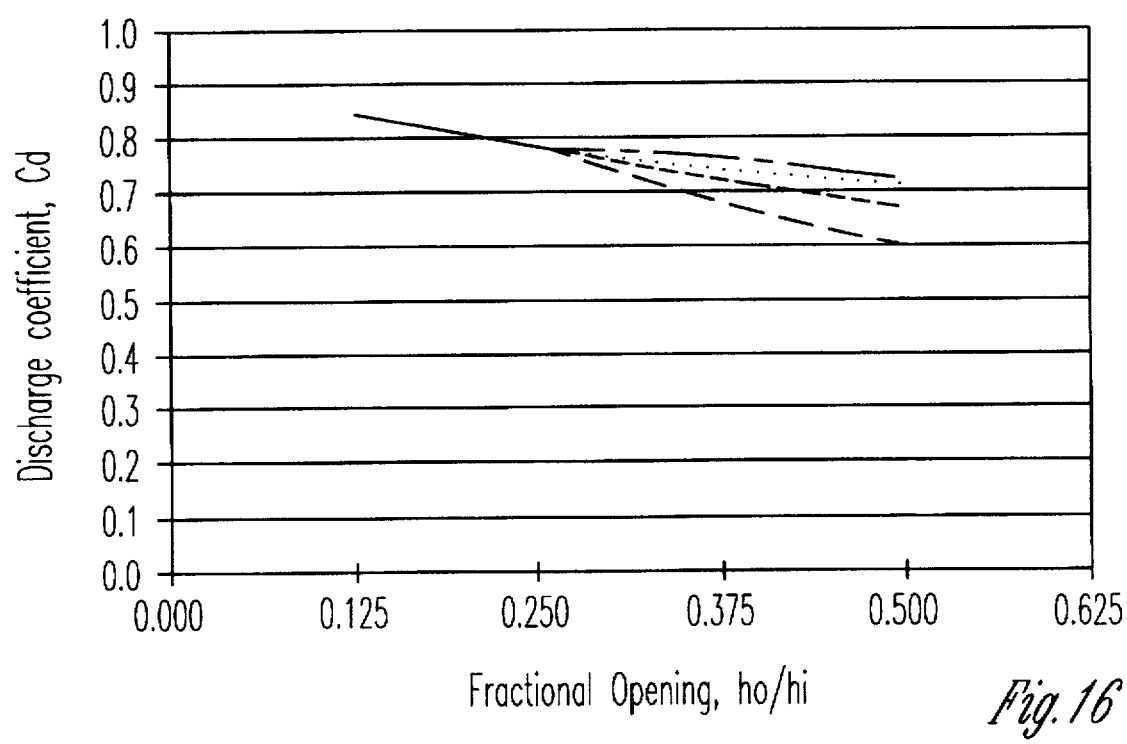
FIG. 16 shows final discharge coefficients for a hood angle of 180 degrees.

To help investigate these trends, a $C_d$ analysis was conducted at $h_i$=0.50 m, and ΔP=19.83 Pa, θ=90, for eight inlet opening ratios ($h_o/h_i$) between 0.25 and 0.38 for each deflecting vane angle (Φ). These thirty-two data points were added to FIG. 7 and are shown in FIG. 11. As shown in FIG. 11, the average discharge coefficient for each deflecting vane angle (Φ) follows, within reason, a straight line from its value at $h_o/h_i$=0.25 to its value at $h_o/h_i$=0.38. If this assumption is made for each hood angle (θ), then the final graphs for each hood angle (θ) are those shown in FIGS. 12 through 16.

FIGS. 12 to 16 are proposed as design guidelines for the generalized inlet shown in FIG. 2, with the hood and deflecting vane designs shown in FIGS. 3 and 4, respectively. With a knowledge of the discharge coefficient, the volumetric flow rate of the inlet can be estimated using Eq. 2.

The conclusions from this invention are:
1. Large variations in discharge coefficient were found within the range of inlet parameters tested. Table 5 shows the discharge coefficient ranged from a high of 0.86 where $h_o/h_i$=0.50, θ=0, and Φ=0 to a low of 0.60 where $h_o/h_i$=0.50, θ=180, and Φ=45.
2. Discharge coefficient was predominately dependent on inlet opening ratio ($h_o/h_i$), deflecting vane angle (Φ), and hood angle (θ). The discharge coefficient remained fairly constant as the static pressure difference or the inlet height changed but varied greatly as the inlet opening ratio ($h_o/h_i$), deflecting vane angle ($\Phi$), or hood angle ($\theta$) changed.

3. For hood angles ($\theta$) greater than 90 degrees the discharge coefficient was predominately dependent on inlet opening ratio ($h_o/h_i$), for an inlet opening ratio ($h_o/h_i$) less than 0.25. The discharge coefficient was dependent on inlet opening ratio ($h_o/h_i$), deflecting vane angle ($\Phi$), and hood angle ($\theta$) if the inlet opening ratio ($h_o/h_i$) was greater than 0.25. Table 5 shows that with an inlet opening ratio of ($h_o/h_i$) of 0.13 the average discharge coefficient remained nearly constant at 0.84 (0.04) and 0.78 (0.01) for an inlet opening ratio of ($h_o/h_i$) of 0.25 regardless of deflecting vane angle ($\Phi$), and hood angle ($\theta$).

4. For a hood angle ($\theta$) of 0 degrees the discharge coefficient was predominately dependent on inlet opening ratio ($h_o/h_i$), for an inlet opening ratio ($h_o/h_i$) less than 0.25. The discharge coefficient was dependent on inlet opening ratio ($h_o/h_i$) and deflecting vane angle ($\Phi$) if the inlet opening ratio ($h_o/h_i$) was greater than 0.25. Table 5 shows that with an inlet opening ratio of ($h_o/h_i$) of 0.13 the average discharge coefficient remained nearly constant at 0.85 (0.04) and 0.81 (0.02) for an inlet opening ratio of ($h_o/h_i$) of 0.25 regardless of deflecting vane angle ($\Phi$).

What is claimed is:

1. An automatic air inlet for livestock facilities, comprising, a housing having an air inlet end, air outlet end, a top, a bottom, sides, and an open interior compartment, a first baffle pivotally secured to said housing intermediate its ends and having an effective length and width to close one half of said compartment to air flow when in a transverse position with respect to said housing, a second baffle opposite to said first baffle and pivotally secured to said housing and having an effective length and width to close one half of said compartment opposite to said first baffle to air flow when in a transverse position with respect to said housing, said first and second baffles being interconnected together by a mechanism to pivot in unison with respect to said housing so as to create a widening air passage therebetween when pivoted in one direction, and to create a narrowing air passage therebetween when pivoted in a second direction; said mechanism being rigidly connected to one baffle, and slidably secured to the other baffle by means of a curved actuating surface whereby the two baffles will pivot together in unison through equal pivotal arcs.

2. The device of claim 1 wherein a resilient means is secured to one of said baffles to cause said baffles to move to a transverse position with respect to said housing.

3. The device of claim 1 wherein said curved actuating surface slides through a slot in a bracket rigidly secured to the other baffle.

4. The device of claim 2 wherein said resilient means is a spring.

5. The device of claim 1 wherein said baffles are secured to the top and bottom of said housing so as to be able to create a horizontal air flow space therebetween.

* * * * *

UNITED STATES PATENT AND TRADEMARK OFFICE
CERTIFICATE OF CORRECTION

PATENT NO. : 5,707,283
DATED : January 13, 1998
INVENTOR(S) : Mark E. Oberreuter; Steven J. Hoff and Fernando Perez-Munoz It is certified that error appears in the above-identified patent and that said Letters Patent is hereby corrected as shown below:

In column 1, line 3, before "Background of the Invention" insert the following:

- The invention was made with government support under the United States Department of Agriculture using Hatch funds; IAHEES project number IA 3140. The United States government has certain rights in this invention. -

Signed and Sealed this

Twenty-first Day of April, 1998

*Attest:*

BRUCE LEHMAN

*Attesting Officer*    Commissioner of Patents and Trademarks